3,459,692
BLENDS COMPRISING CHLORINATED POLYVINYL CHLORIDE AND CHLORINATED POLYETHYLENE
Robert Büning and Hans-Ewald Konermann, Oberlar, and Karl-Heinz Diessel, and Gerhard Bier, Troisdorf, Germany, assignors to Dynamit Nobel Aktiengesellschaft, Troisdorf, Germany, a corporation of Germany
No Drawing. Filed Apr. 21, 1966, Ser. No. 544,092
Claims priority, application Germany, May 21, 1965, D 47,327
Int. Cl. C08f 29/24, 29/14, 29/04
U.S. Cl. 260—23                                                                 7 Claims

ABSTRACT OF THE DISCLOSURE

Blends of chlorinated polyvinyl chloride and chlorinated polyethylene, the polyvinyl chloride having originally been predominantly syndiotactic, are disclosed. The blends are useful as molding compositions.

---

This invention relates to the production of molding compositions on the basis of post-chlorinated polyvinyl chloride and more particularly relates to the production of molding compositions on the basis of post-chlorinated polyvinyl chloride containing post-chlorinated polyethylene.

Molding compositions consisting of polyvinyl chloride and post-chlorinated polyethylene are known. Molding compositions prepared from post-chlorinated atactic polyvinyl chloride and post-chlorinated polyethylene are also known. Shaped bodies produced from such molding compositions are characterized by high impact strengths while shaped bodies produced from sterically ordered polyvinyl chloride and post-chlorinated polyethylene are brittle. This is due to the fact that the sterically ordered polyvinyl chloride, which tends to crystallize out readily, recrystallizes following the processing due to the addition of post-chlorinated polyethylene. (See Belgain Patent No. 628,843.) Consequently, the use of molding compositions on the basis of post-chlorinated polyvinyl chloride and containing post-chlorinated polyethylene as a plastic in industry has been limited to very few applications.

It is an object of the present invention to provide a process for the production of molding compositions on the basis of post-chlorinated polyvinyl chloride and containing post-chlorinated polyethylene, which compositions do not tend to crystallization.

It is a further object of the invention to provide a process for the production of thermally-stable molding compositions on the basis of post-chlorinated polyvinyl chloride and containing post-chlorinated polyethylene, which are at the same time not deprived of other desirable properties—i.e., which are not brittle or difficult to work, and the like.

A still further object of the present invention is to provide novel molding compositions on the basis of post-chlorinated polyvinyl chloride and containing post-chlorinated polyethylene which are thermally stable and which have improved toughness, impact resistance, etc.

Other objects will become apparent from the following discussion:

Now, in accordance with the invention, it has been found that thermally-stable molding compositions having good impact strengths on the basis of chlorinated polyvinyl chloride and containing post-chlorinated polyethylene can be obtained by incorporating about 0.5 to 25 parts by weight of a post-chlorinated polyethylene containing about 20 to 60% by weight chlorine and having a relative viscosity of about 1.5 to 18 into 75 to 99.5 parts by weight of a post-chlorinated polyvinyl chloride containing about 58 to 71% chlorine, and having a relative viscosity of about 1.5 to about 6.5, of which about 55 to about 85% of the chlorine atoms were originally of syndiotactic arrangement. If desired, other conventional additives, including other polymers, may also be simultaneously incorporated into this composition. The molding compositions thereby obtained surprisingly demonstrate substantially no tendency toward crystallization.

Shaped bodies, which are produced from molding compositions in accordance with the invention, have excellent impact strengths and demonstrate higher thermal stabilities than do shaped bodies produced from the known molding compositions as, for instance, from post-chlorinated atactic polyvinyl chloride and post-chlorinated polyethylene, even though no recrystallization occurs following processing. As post-chlorinated sterically-arranged polyvinyl chloride suitable for use in accordance with the invention, there may be used polymers which have been obtained by post-chlorination of sterically-arranged polyvinyl chloride having about 55 to 85% syndiotactic arrangement of the chlorine atoms according to the conventional chlorination methods employed for this purpose, where the original steric arrangement in the polymer is substantially maintained. Thus, for instance, the post-chlorination can be carried out in suspension in aqueous hydrochloric acid using swelling agents and under the influence of light, preferably ultra-violet light, with an excess of chlorine, at a temperature of from about +15° to +35° C. (See Belgain Patent No. 643,500.) The relative viscosities of the post-chlorinated stereo-regular polyvinylchloride should amount to from 1.5 to 6.5 and the chlorine content to about 58 to 71%. Such a post-chlorinated sterically-arranged polyvinyl chloride differs substantially both in its physical and chemical properties and characteristics from a post-chlorinated atactic polyvinyl chloride.

As post-chlorinated polyethylene for use in the present invention, there are advantageously employed post-chlorinated polyethylenes obtained by the post-chlorination of polyethylene having a density of about 0.91 to 0.96 by the conventional methods for this purpose. The post-chlorinated polyethylene should have a chlorine content of about 20 to 60% and a relative viscosity of about 1.5 to 18. In order to obtain high impact strengths, a compound having a chlorine content of between 35 and 45% is preferably employed.

The molding compositions in accordance with the invention may possibly contain additional other high molecular polymers, such as polyvinyl acetate, polyethylene, polyacrylonitrile, etc. The conventional additives which may additionally be worked into the compositions are illustrated, for example, by lubricants, such as low-molecular polyethylenes, low-molecular polyethylene-polyethylene-oxide (molecular wt. 3,000–20,000), stearic acid, vinyl stearate, chlorinated paraffins, and the like, stabilizers such as barium cadmium stearate, lithium stearate, calcium stearate, cobalt stearate, lead sulfate (also basic), lead carbonate zinc organo-compounds, epoxy compounds as, for example, epoxidized soybean oil and the like, pigments, colorants, and fillers such as halogenated polymeric materials, titanium dioxide, carbon, asbestos and the like, silicon-containing compounds, light-protecting agents such as phosphoric acid esters, and the like.

The molding compositions in accordance with the present invention can be used for the production of sheets, fibers, films and coatings and shaped bodies, such as tubes, plates, and the like. The compositions as well as the resultant products are characterized by improved breaking strengths, thermo-stability, flame resistance and cold strengths, and in their combination of these properties surpass shaped bodies which have been made from previously known molding compositions.

The variation in chlorine contents and of the viscosities of the post-chlorinated polyvinyl chloride and chlorinated polyethylene results in the production of molding compositions which as compared to the known molding compositions on the bisis of post-chlorinated atactic polyvinyl chloride and chlorinated polyethylene are characterized by increased dimensional stabilities, i.e., Vicat values 8–15° C. higher (5 kg. load determined in accordance with the procedure designated VDE 0302/III 43) while high U-notch impact strengths are obtained over the known products.

The following examples illustrate the invention without in any way limiting the scope thereof.

EXAMPLE 1

289 grams (80 parts) post-chlorinated sterically ordered polyvinyl chloride having an original syndiotactic arrangement amounting to about 70% which had been post-chlorinated by the method of Belgian Patent 643,500, i.e., by post-chlorination of the corresponding polymers in hydrochloric acid suspension with chloroform as swelling agent, using ultraviolet light and an excess of chlorine at a temperature of about 25° C., having a K-value of 72.6 (cf. H. Fikentscher, Cellulosechemie 13, page 60 (1932), a Vicat valve of 127° C. under 5 kg. load (determined in accordance with the procedure designated VDE 0302/III 43) and having a chlorine content of 66.4% were mixed with 70 grams (20 parts) post chlorinated polyethylene having a chlorine content of 39.8% and a relative viscosity of 3.8, 8.75 g. of barium-cadmium stearate and 0.7 g. of polyethylene (molecular weight 5000) as lubricant and worked on the roll at 180° C. for 20 minutes to produce a rough sheet having a thickness of 0.5 mm. This sheet while still hot was pressed for 5 minutes at 190° C. to form a plate of a thickness of 4 mm.

EXAMPLES 2 TO 4

Example 1 was repeated varying the amounts of the additions of post-chlorinated polyethylene to the post-chlorinated sterically ordered polyvinyl chloride. The U-notch impact strength and the Vicat stability under heat were determined on plates having a thickness of 4 mm. and which had been prepared from the individual molding compositions. The results are set forth in Table 1.

TABLE 1

| Post-chlorinated atactic polyvinyl chloride (parts by weight) | Post-chlorinated polyethylene (parts by weight) | U-Notch impact strength (cm. kg. cm.$^{-2}$) | Vicat, ° C. |
| --- | --- | --- | --- |
| 80 | 20 | 50.5 | 97.4 |
| 85 | 15 | 28.4 | 104.2 |
| 90 | 10 | 16.1 | 109.5 |
| 95 | 5 | 8.7 | 122.6 |

EXAMPLES 5 TO 8

Examples 1 to 4 were repeated, as comparative examples, except that instead of the post-chlorinated sterically ordered polyvinyl chloride, a correspondingly post-chlorinated atactic polyvinyl chloride was used. The post-chlorinated atactic polyvinyl chloride was produced, like the post-chlorinated stereoregular polyvinyl chloride, by the method of Belgian Patent 643,500, i.e., by post-chlorination of the corresponding polymers in hydrochloric-acid suspension with chloroform as swelling agent, using ultraviolet light and an excess of chlorine at a temperature of about 25° C. The degree of chlorination of the two products agreed within the limits of error.

The values measured on the plates produced from the resulting compositions are set forth in Table 2 which follows:

TABLE 2

| Post-chlorinated atactic polyvinyl chloride (parts by weight) | Post-chlorinated polyethylene (parts by weight) | U-Notch impact strength (cm. kg. cm.$^{-2}$) | Vicat, ° C. |
| --- | --- | --- | --- |
| 80 | 20 | 51.0 | 86.2 |
| 85 | 15 | 27.9 | 92.4 |
| 90 | 10 | 16.4 | 100.6 |
| 95 | 5 | 8.3 | 111.0 |

We claim:

1. Process of producing molding compositions on the basis of post-chlorinated polyvinyl chloride and containing post-chlorinated polyethylene which comprises incorporating about 0.5 to 25 parts by weight of a post-chlorinated polyethylene containing about 20 to 60% by weight chlorine and having a relative viscosity of about 1.5 to 18 into 75 to 99.5 parts by weight of a post-chlorinated polyvinyl chloride containing about 58 to 71% chlorine having a relative viscosity of about 1.5 to about 6.5 and originally having about 55 to about 85% syndiotactic arrangement of chlorine atoms.

2. Process according to claim 1, wherein said post-chlorinated polyethylene contains from 35 to 45% by weight chlorine.

3. A molding composition comprising 75 to 99.5 parts by weight of post-chlorinated polyvinyl chloride containing about 58 to 71% chlorine having a relative viscosity of about 1.5 to about 6.5 and originally having about 55 to about 85% syndiotactic arrangement of chlorine atoms and 0.5 to 25 parts by weight of post-chlorinated polyethylene containing about 20 to 60% by weight chlorine and having a relative viscosity of about 1.5 to 18.

4. A molding composition comprising 80 parts of a post-chlorinated polyvinyl chloride having a chlorine content of 66.4%, a K-value of 72.6, a Vicat value of 127° C. (5 kg. load) and originally having about 70% syndiotactic arrangement of chlorine atoms, 20 parts-chlorinated polyethylene having a chlorine content of 39.8% and a relative viscosity of 3.8 and barium-cadmium stearate and polyethylene as lubricant.

5. A molding composition comprising 85 parts of a post-chlorinated polyvinyl chloride having a chlorine content of 66.4%, a K-value of 72.6, a Vicat value of 127° C. (5 kg. load) and originally having about 70% syndiotactic arrangement of chlorine atoms, 15 parts post-chlorinated polyethylene having a chlorine content of 39.8% and a relative viscosity of 3.8 and barium-cadmium stearate and polyethylene as lubricant.

6. A molding composition comprising 90 parts of a post-chlorinated polyvinyl chloride having a chlorine content of 66.4%, a K-value of 72.6, a Vicat value of 127° C. (5 kg. load) and originally having about 70% syndiotactic arrangement of chlorine atoms, 10 parts post-chlorinated polyethylene having a chlorine content of 39.8% and a relative viscosity of 3.8 and barium-cadmium stearate and polyethylene as lubricant.

7. A molding composition comprising 95 parts of a post-chlorinated polyvinyl chloride having a chlorine content of 66.4%, a K-value of 72.6, a Vicat value of 127° C. (5 kg. load) and originally having about 70% syndiotactic arrangement of chlorine atoms, 5 parts post-chlorinated polyethylene having a chlorine content of 39.8% and a relative viscosity of 3.8 and barium-cadmium stearate and polyethylene as lubricant.

References Cited

UNITED STATES PATENTS

| | | | |
|---|---|---|---|
| 3,006,889 | 10/1961 | Frey | 260—897 |
| 3,165,560 | 1/1965 | Frey et al. | 260—897 |
| 3,299,182 | 1/1967 | Jennings et al. | 260—897 |
| 3,341,628 | 9/1967 | Buning et al. | 260—899 |
| 3,364,163 | 1/1968 | Kraemer et al. | 260—23 |

DONALD E. CZAJA, Primary Examiner

R. A. WHITE, Assistant Examiner

U.S. Cl. X.R.

260—41, 897

PO-1050
(5/69)

UNITED STATES PATENT OFFICE
CERTIFICATE OF CORRECTION

Patent No. 3,459,692      Dated August 5, 1969

Inventor(s) Robert Büning, Hans-Ewald Konermann, Karl-Heinz Diessel and Gerhard Bier It is certified that error appears in the above-identified patent and that said Letters Patent are hereby corrected as shown below:

Column 3, line 33, "289" should be --280--; column 4, line 50, "20 parts-chlorinated" should be --20 parts post-chlorinated--

SIGNED AND
SEALED
JAN 20 1970

(SEAL)
Attest:

Edward M. Fletcher, Jr.
Attesting Officer

WILLIAM E. SCHUYLER, JR.
Commissioner of Patents